US012577983B2

(12) United States Patent
Zou et al.

(10) Patent No.: US 12,577,983 B2
(45) Date of Patent: Mar. 17, 2026

(54) ELECTRICALLY INSULATED BEARING RING AND APPLICATIONS THEREOF

(71) Applicant: AKTIEBOLAGET SKF, Gothenburg (SE)

(72) Inventors: Zhonghua Zou, Shanghai (CN); Yanqin Gao, Shanghai (CN); Hongyan Wang, Shanghai (CN)

(73) Assignee: AKTIEBOLAGET SKF, Gothenburg (SE)

( * ) Notice: Subject to any disclaimer, the term of this patent is extended or adjusted under 35 U.S.C. 154(b) by 48 days.

(21) Appl. No.: 18/443,415

(22) Filed: Feb. 16, 2024

(65) Prior Publication Data

US 2024/0288034 A1     Aug. 29, 2024

(30) Foreign Application Priority Data

Feb. 24, 2023    (CN) ........................ 202310159650.X

(51) Int. Cl.
| | |
|---|---|
| *F16C 19/06* | (2006.01) |
| *F16C 19/52* | (2006.01) |
| *F16C 33/58* | (2006.01) |
| *F16C 35/073* | (2006.01) |
| *F16C 35/077* | (2006.01) |
| *F16C 41/00* | (2006.01) |

(52) U.S. Cl.
CPC ............ *F16C 19/06* (2013.01); *F16C 19/525* (2013.01); *F16C 33/586* (2013.01); *F16C 35/073* (2013.01); *F16C 35/077* (2013.01); *F16C 41/002* (2013.01); *F16C 2202/30* (2013.01); *F16C 2208/04* (2013.01); *F16C 2208/20* (2013.01); *F16C 2208/40* (2013.01); *F16C 2220/04* (2013.01); *F16C 2380/26* (2013.01)

(58) Field of Classification Search
CPC ...... F16C 19/06; F16C 19/525; F16C 33/586; F16C 35/073; F16C 35/077; F16C 41/002; F16C 2202/30; F16C 2208/04; F16C 2208/20; F16C 2208/40; F16C 2380/26
See application file for complete search history.

(56) References Cited

U.S. PATENT DOCUMENTS

| | | | | |
|---|---|---|---|---|
| 5,375,933 | A | * | 12/1994 | Mizutani ................. F16C 33/62 384/492 |
| 5,961,222 | A | * | 10/1999 | Yabe ..................... F16C 33/586 384/477 |
| 2013/0267448 | A1 | * | 10/2013 | Goodan ............... C10M 169/02 508/155 |

FOREIGN PATENT DOCUMENTS

| | | | | | |
|---|---|---|---|---|---|
| DE | 102020201509 | A1 | * | 8/2021 | ............ F16C 41/002 |
| JP | 2003120688 | A | * | 4/2003 | |
| WO | WO-2017103117 | A1 | * | 6/2017 | .............. F16C 33/24 |
| WO | WO-2022202651 | A1 | * | 9/2022 | .............. F16C 19/06 |

OTHER PUBLICATIONS

WO2022202651_A1_Description.*

* cited by examiner

*Primary Examiner* — Phillip A Johnson
(74) *Attorney, Agent, or Firm* — J-TEK LAW PLLC; Scott T. Wakeman; Mark A. Ussai

(57) ABSTRACT

An electrically insulated bearing ring has an electrical insulation layer, the electrical insulation layer including a composite having a synthetic resin as a matrix, a fiber filler for increasing the strength of the composite and a thermally conductive filler for increasing the thermal conductivity of the composite. An electrically insulated rolling bearing incorporates the electrically insulated bearing ring.

7 Claims, 1 Drawing Sheet

ELECTRICALLY INSULATED BEARING RING AND APPLICATIONS THEREOF

CROSS-REFERENCE

This application claims priority to Chinese patent application no. 202310159650.X filed on Feb. 24, 2023, the contents of which are fully incorporated herein by reference.

BACKGROUND OF THE INVENTION

The present invention relates to bearings, and more particularly to an electrically insulated bearing ring with an electrically insulated layer formed by a composite material and an electrically insulated rolling bearing employing such electrically insulated bearing rings.

During the design, manufacture or installation of a motor, deviations in the magnetic pole distribution or the motor shaft position can lead to asymmetries of the magnetic field. The magnetic flux alternates between symmetrical and asymmetrical states so that the motor shaft cutting the magnetic lines during rotation forms an induced electric potential and the voltage difference between the motor shaft and the housing is called a "shaft voltage" (i.e., the voltage acting between the inner ring and outer ring of the bearing). When the amplitude of the shaft voltage is large enough to break through the lubricant film, a current will pass through the outer ring, the lubricant film and the inner ring of the bearing to form a "shaft current" (also known as "leakage current"). The leakage current caused by the lubricant film discharge will form micro-pits on the surfaces of the bearing raceways, a phenomenon known as "galvanic corrosion". Even if the current strength is relatively weak, the galvanic corrosion phenomenon still exists.

A traditional method of blocking the leakage current is to provide an electrical insulation coating on the radial surface (s) of a bearing ring (typically the outer circumferential surface of the outer ring and/or the inner circumferential surface of the inner ring). Conventional electrical insulation coatings are typically made of ceramic materials, usually containing aluminum oxide in composition, and are formed on the above-mentioned surface(s) of the bearing ring by plasma spraying. Although ceramics are insulating materials, these materials usually have dielectric constants between 8.5 and 10 and therefore they are polar or even strongly polar dielectric materials. If the inner and outer rings of a bearing can be considered as a type of parallel plate capacitor, then according to the equation $C=\varepsilon S/d$ (where C is the capacitance value of the parallel plate capacitor, $\varepsilon$ is the dielectric constant of the medium between the plates, S is the area of the plates, and d is the distance between the plates), a ceramic material with a relatively high dielectric constant will result in a higher capacitance value of the bearing. This means that, in particular under the action of high-frequency shaft voltage, the leakage current will still reach a high amplitude, such that the galvanic corrosion effect on the bearing is still not insubstantial. In addition, the plasma spraying process inevitably leaves material pores in the ceramic coating. This requires an additional sealing process to seal these pores and prevent them from affecting the electrical insulation property of the coating due to moisture retention in high humidity environments. The additional pore-sealing process further increases the manufacturing cost of the ceramic coatings.

Thus, there is a need for a solution in which the leakage current is further suppressed to thus weaken the galvanic corrosion effect on the bearings.

SUMMARY OF THE INVENTION

To solve the above technical problems, the present invention provides an electrically insulated bearing ring comprising an electrical insulation layer for stopping the passage of the leakage current, the electrical insulation layer comprising a composite comprising the following components: a synthetic resin used as matrix, a fiber filler used to increase the strength of the composite, and a thermally conductive filler used to improve the thermal conductivity of the composite.

Compared to ceramic coatings, the composite insulation layer of the above components has a significantly lower dielectric constant, such that the significantly increased capacitive impedance can curb the intensity of the leakage current and fundamentally mitigate the galvanic corrosion effect caused by the leakage current. In addition, a proper ratio of the fiber filler and the thermally conductive filler enables the insulation layer to achieve the mechanical strength as well as the thermal performance required for the operation of the bearing.

Based on the above electrically insulated bearing ring, the present invention further provides a rolling bearing. When used for motor spindle support, such a bearing is capable of mitigating the galvanic corrosion effect, thereby extending the service life of the bearing.

The various embodiments and beneficial technical effects of the present invention will be described in detail below with reference to the accompanying drawings.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Figure 1:
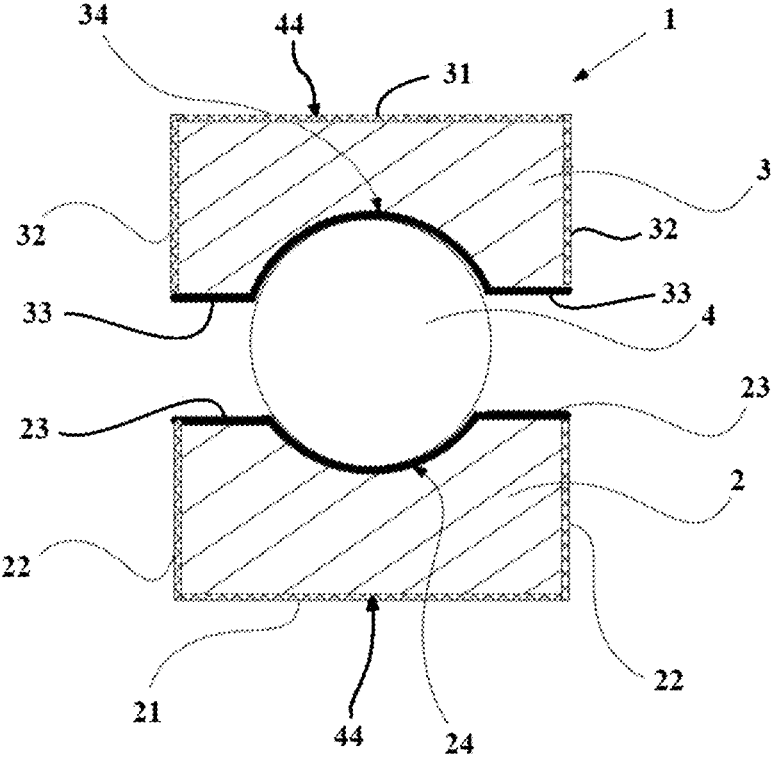
FIG. 1 shows a cross-sectional view of a local structure of the electrically insulated rolling bearing and its electrical insulation layers according to the present invention.

In the following description, the same or similar reference numerals are used throughout to indicate the same or similar elements. In addition, terms indicating orientations, such as "axial", "radial" and "circumferential", refer to the axial, radial and circumferential directions of the element being described unless otherwise limited or specified.

FIG. 1 shows a cross-sectional view of a local structure of an electrically insulated rolling bearing 1 in accordance with the present invention. Using a ball bearing as an example, the rolling bearing 1 includes an inner ring 2, an outer ring 3 and at least one row of rolling elements 4 arranged between an inner ring raceway 24 and an outer ring raceway 34. Unlike non-insulated bearings, the insulated bearing 1 has an electrical insulation layer 44 formed on a corresponding surface of its inner ring 2 and/or outer ring 3, the insulation layer 44 being configured to block or stop the passage of electric leakage current(s). In the specific embodiment shown, the insulation layer 44 may be formed on an inner surface 21 of the inner ring 2 or on an outer surface 31 of the outer ring 3. In addition, the insulation layer 44 may be further formed on the end surfaces 22 on both axial sides of the inner ring 2 and/or on the end surfaces 32 on both axial sides of the outer ring 3 of the bearing 1.

In principle, the insulation layer 44 can be formed on all surfaces of the inner ring 2 and outer ring 3 of the bearing 1 except the raceways 24 and 34, even including the surfaces of the shoulders 23 on both sides of the inner ring raceway 24 and the shoulders 33 on both sides of the outer ring raceway 34, respectively. In the following description, each one of the above-mentioned surfaces of a bearing ring that can be coated with an insulation layer 44 to prevent the leakage current through the rolling bearing 1 is referred to as a "corresponding surface".

In contrast to ceramic coatings, the insulation layer 44 described in the present invention is made of a composite material (hereinafter also referred to as "the composite") containing the following constituents or components: a synthetic resin used as matrix, a fiber filler used to increase the strength of the composite, and a thermally conductive filler used to improve the thermal conductivity of the composite. Among these components, the synthetic resin used as a matrix usually has a low dielectric constant, averaging between 3.0 and 3.5, which is about ⅓ of that of ceramics. Although the fiber filler and the thermally conductive filler

4 ethyl-1,4-phenylene ether or "PPO"), twenty weight percent (20 wt %) of glass fiber (GF) and fifteen weight percent (15 wt %) of hexagonal boron nitride (h-BN). Among them, polyphenylene ether (PPO), also known as "polyphenylene oxide", has the smallest dielectric constant (2.6 to 2.8) and dielectric loss angle tangent among engineering plastics, and is a type of thermoplastic resin with excellent electrical insulation properties. Tests have proven that the excellent dielectric properties of PPO make composites using PPO as a matrix generally also have lower dielectric constants than composites formed with other matrices. By adding GF and h-BN to PPO, it is possible to achieve increased rigidity, strength and heat dissipation capability at temperatures near the glass transition.

Figure 2:
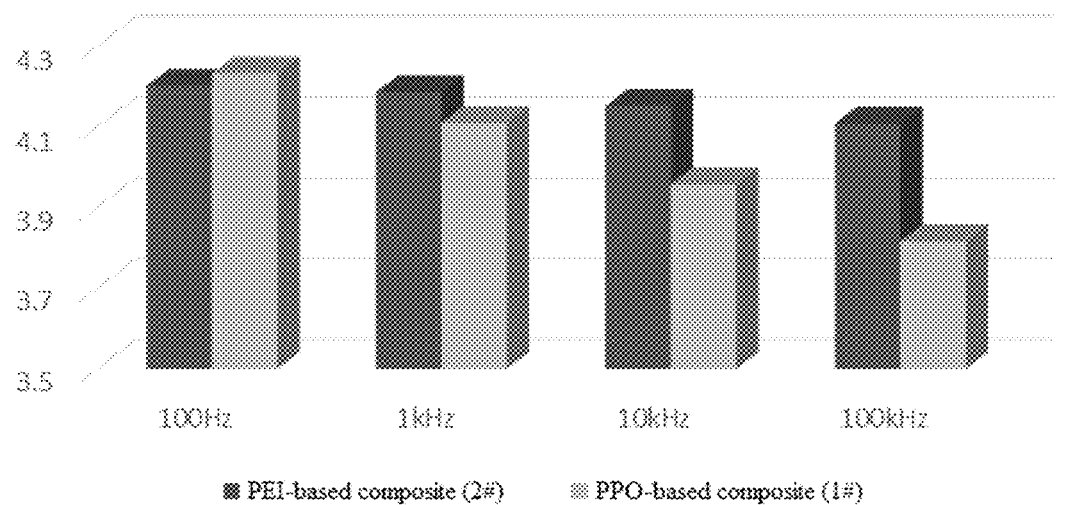
FIG. 2 shows the measured data of the dielectric constant of the electrical insulation layers in different embodiments of the present invention.

Table 1 and FIG. 2 show the test results of the present invention in two embodiments. In the first embodiment, the dielectric constant of the composite insulation layer 44 of the above components varies between 4.23 and 3.80 depending on the frequency (100 Hz to 100 kHz). Compared with the dielectric constant (2.6 to 2.8) of pure PPO, the dielectric constant of the composite insulation layer 44 has increased, but the suppression of the leakage current is still much superior to that of ceramic coatings. In addition, Table 1 shows that the 15 wt % h-BN increases the thermal conductivity of the composite insulation layer 44 to 1.30 W/m·K, which is several times greater than the thermal conductivity (0.18 to 0.29 W/m·K) of PPO as the matrix. Obviously, the significant increase in thermal conductivity is particularly beneficial in meeting the requirements for the thermal performance of the insulation layer 44 during bearing operation.

TABLE 1

| Insulation Layer | Embodiment 1# | Content (wt %) | Embodiment 2# | Content (wt %) |
|---|---|---|---|---|
| Components | polyphenylene ether (PPO) | 65 | polyetherimide (PEI) | 65 |
| | glass fiber (GF) | 20 | glass fiber (GF) | 20 |
| | hexagonal boron nitride (h-BN) | 15 | hexagonal boron nitride (h-BN) | 15 |
| Properties | thermal conductivity (W/m · K) | 1.3 | thermal conductivity (W/m · K) | 1.2 |
| | dielectric constant | 4.23~3.80 | dielectric constant | 4.20~4.10 | can increase the dielectric constant of the composite to a certain extent, for example, providing an average increase of the dielectric constant by 20-30%, these components will also significantly improve the mechanical and thermal properties of the composite, thereby achieving the multifaceted performance requirements of the insulation layer 44 for the bearing 1.

Thus, the insulation layer 44 formed by the composite material still allows the capacitive impedance of the insulated bearing 1 to reach an average of two to three times that of the ceramic coatings (since capacitive impedance is inversely proportional to capacitance value). All other things being equal, a multiple magnification of the capacitive impedance significantly reduces the leakage current of the bearing 1, thus significantly suppressing the described galvanic corrosion effect.

A first embodiment of the electrical insulation layer 44 according to the present invention is described below. In this embodiment, the composite material forming the electrical insulation layer 44 preferably comprises sixty-five weight percent (65 wt %) of polyphenylene ether (poly-2,6-dim- Tests have further shown that the composite insulation layer 44 formed with PPO as the matrix has a balanced combination of dielectric, mechanical and thermal properties when the combined component ratio of GF and h-BN is between 30-70 wt % and their relative weight ratios are between 1:1 and 1.8:1.

A second embodiment of the electrical insulation layer 44 according to the present invention is described below. In this second embodiment, the composite material forming the electrical insulation layer 44 comprises: sixty-five weight percent (65 wt %) of polyetherimide (PEI), twenty weight percent (20 wt %) of glass fiber (GF) and fifteen weight percent (15 wt %) of hexagonal boron nitride (h-BN). Among them, polyetherimide (PEI) is the best engineering plastic with high temperature resistance and dimensional stability. In addition to excellent mechanical properties (strength, rigidity, fatigue resistance and molding processability), it also has outstanding electrical insulation properties. PEI has a stable dielectric constant, dielectric loss and high dielectric strength over a wide range of frequencies and temperatures. By adding GF and h-BN to PEI, it is possible to achieve increased rigidity, strength and heat dissipation capability at temperatures near the glass transition.

Table 1 and FIG. 2 show that, in the second embodiment, the dielectric constant of the composite insulation layer 44 of the above components varies between 4.20 and 4.10 depending on the frequency (100 Hz to 100 kHz). Compared with the dielectric constant of pure PEI (3.15), the dielectric constant of the composite insulation layer 44 is greater, but the suppression of the leakage current is still much superior to that of ceramic coatings. In addition, Table 1 also shows that 15 wt % of h-BN increases the thermal conductivity of the composite insulation layer 44 to 1.20 W/m·K, which is several times greater than the thermal conductivity of PEI (0.22 to 0.35 W/m·K) as the matrix material. Obviously, the significant increase in thermal conductivity is particularly beneficial in meeting the requirements for the thermal performance of the insulation layer 44 during bearing operation.

Tests have further shown that the composite insulation layer 44 formed with PEI as the matrix has a balanced combination of dielectric, mechanical and thermal properties when the combined component ratio of GF and h-BN is between thirty weight percent (30 wt %) and seventy weight percent (70 wt %) and their relative weight ratios are between 1:1 and 1.8:1. In the present invention, the electrical insulation layer 44 may be formed on the corresponding surface(s) of the bearing ring 2 or 3 by spraying or injection molding. Using an injection molding process as an example, the bonding force between the injection molded insulation layer 44 and the bearing ring 2 or 3 can be increased by forming an embedded structure, such as grooves, on the corresponding surface(s) of the bearing ring 2 and/or 3, the embedded structure being configured to prevent peeling of the insulation layer. The insulation layer 44 is capable of withstanding a breakdown voltage of more than 5000 V in a thickness range up to 0.2 mm. Depending on the needs of the bearing applications, the insulation layer 44 may be provided with a thickness between 0.2-5 mm, preferably further between 0.4-1.5 mm.

It should be understood by those skilled in the art that the above electrically insulated bearing ring 2 or 3 and electrically insulated bearing 1 are not limited by the specific embodiments and that the more general technical solutions will be subject to the limitations in the accompanying claims. Any changes and modifications to the present invention are within the scope of protection of the present invention, provided they conform to the limitations of the accompanying claims.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

We claim:

1. An electrically insulated bearing ring comprising:
a bearing ring having an electrical insulation layer configured to stop the passage of leakage currents, the electrical insulation layer including a composite formed of a synthetic resin matrix, a fiber filler for increasing the strength of the composite, and a thermally conductive filler for increasing thermal conductivity of the composite;
wherein the synthetic resin is polyphenylene ether (PPO) or polyetherimide (PEI), the fiber filler is glass fiber (GF), and the thermally conductive filler is hexagonal boron nitride (h-BN), the glass fibers (GF) and the hexagonal boron nitride (h-BN) have a combined component percentage of between thirty weight percent (30 wt %) and seventy weight percent (70 wt %) and the relative weight ratio of the glass fibers (GF) to the hexagonal boron nitride (h-BN) is between 1:1 and 1.8:1.

2. The electrically insulated bearing ring according to claim 1, wherein the electrical insulation layer is formed on a corresponding surface of the bearing ring by injection molding, the corresponding surface of the bearing ring being formed with an embedded structure configured to prevent peeling of the insulation layer.

3. The electrically insulated bearing ring according to claim 2, wherein a thickness of the insulation layer is between two-tenths of a millimeter (0.2 mm) and five millimeters (5 mm).

4. The electrically insulated bearing ring according to claim 3, wherein the thickness of the insulation layer is between four-tenths of a millimeter (0.4 mm) and one and one-half millimeters (1.5 mm).

5. An electrically insulated rolling bearing comprising at least one electrically insulated bearing ring according to claim 1.

6. The electrically insulated rolling bearing according to claim 5, wherein the electrical insulation layer is formed on a corresponding surface of the at least one bearing ring, the corresponding surface including an inner surface of an inner bearing ring and/or an outer surface of an outer bearing ring.

7. The electrically insulated rolling bearing according to claim 6, wherein the corresponding surface further includes end surfaces on both axial sides of the inner bearing ring and/or end surfaces on both axial sides of the outer bearing ring.

* * * * *